United States Patent
Tanaka

(10) Patent No.: US 10,764,621 B2
(45) Date of Patent: Sep. 1, 2020

(54) AUTHENTIC SERVER, USER TERMINAL, CONTENT SERVER, CONTROL METHOD FOR THESE, AND COMPUTER PROGRAM

(71) Applicant: Rakuten, Inc., Tokyo (JP)

(72) Inventor: Daichi Tanaka, Tokyo (JP)

(73) Assignee: Rakuten, Inc., Tokyo (JP)

( * ) Notice: Subject to any disclaimer, the term of this patent is extended or adjusted under 35 U.S.C. 154(b) by 0 days.

(21) Appl. No.: 15/740,067

(22) PCT Filed: Jun. 29, 2015

(86) PCT No.: PCT/JP2015/068651
§ 371 (c)(1),
(2) Date: Dec. 27, 2017

(87) PCT Pub. No.: WO2017/002158
PCT Pub. Date: Jan. 5, 2017

(65) Prior Publication Data
US 2018/0192103 A1 Jul. 5, 2018

(51) Int. Cl.
*H04N 21/258* (2011.01)
*H04N 21/4627* (2011.01)
(Continued)

(52) U.S. Cl.
CPC ....... *H04N 21/25875* (2013.01); *H04N 21/25* (2013.01); *H04N 21/25816* (2013.01);
(Continued)

(58) Field of Classification Search
CPC ............ H04N 21/25875; H04N 21/25; H04N 21/25816; H04N 21/44209; H04N 21/4627; H04L 9/3213
(Continued)

(56) References Cited

U.S. PATENT DOCUMENTS 6,374,402 B1 * 4/2002 Schmeidler ............ G06F 21/10
348/E5.008
2006/0085862 A1 4/2006 Witt et al.
(Continued)

FOREIGN PATENT DOCUMENTS

| JP | 2004-356867 A | 12/2004 |
| JP | 2011-182262 A | 9/2011 |
| JP | 2013-229644 A | 11/2013 |

OTHER PUBLICATIONS

Communication dated May 14, 2018 from the European Patent Office in counterpart European application No. 15897085.5.
(Continued)

*Primary Examiner* — Alfonso Castro
(74) *Attorney, Agent, or Firm* — Sughrue Mion, PLLC

(57) ABSTRACT

An authentication server that authenticates a user of a user terminal that plays a content stream provided by a content server, the authentication server authenticating the user. The authentication server includes storage means that stores registration information, authentication means that, when receiving an authentication request for content designated by a first user from a user terminal that the first user is using, compares information included in the authentication request with the registration information and authenticates the first user, generation means that, if the authentication succeeds, generates a first token indicating that the first user is an authenticated user, and communications means that transmits the generated first token to the user terminal. The generation means further generates a second token relating to the same content as the content designated by the first user, and the communications means is further configured to transmit the second token to the user terminal.

12 Claims, 6 Drawing Sheets

(51) Int. Cl.
*H04N 21/25* (2011.01)
*H04N 21/442* (2011.01)
*H04L 9/32* (2006.01)

(52) U.S. Cl.
CPC ... *H04N 21/44209* (2013.01); *H04N 21/4627* (2013.01); *H04L 9/3213* (2013.01)

(58) Field of Classification Search
USPC .......................................................... 725/25
See application file for complete search history.

(56) References Cited

U.S. PATENT DOCUMENTS

| | | | |
|---|---|---|---|
| 2007/0044146 A1 | 2/2007 | Murase et al. | |
| 2008/0235733 A1* | 9/2008 | Heie | H04N 7/163 725/46 |
| 2009/0161871 A1 | 6/2009 | Chaudhry | |
| 2009/0165034 A1* | 6/2009 | Chaudhry | H04N 7/17318 725/25 |
| 2010/0011391 A1* | 1/2010 | Carpenter | H04N 7/17318 725/25 |
| 2011/0276797 A1 | 11/2011 | Pedlow et al. | |
| 2014/0298376 A1* | 10/2014 | Farrugia | H04N 7/165 725/31 |
| 2014/0317660 A1* | 10/2014 | Cheung | H04N 21/6175 725/44 |
| 2015/0128165 A1 | 5/2015 | Matuchniak et al. | |
| 2015/0172739 A1* | 6/2015 | Shaw | H04N 21/25816 725/31 |
| 2015/0181263 A1 | 6/2015 | Gordon et al. | |
| 2017/0347390 A1* | 11/2017 | Cho | H04W 80/10 |

OTHER PUBLICATIONS

Communication dated Jun. 1, 2018 from the European Patent Office in counterpart European application No. 15897085.5.
International Search Report for PCT/JP2015/068651, dated Aug. 11, 2015.

* cited by examiner

105

| USER ID 501 | USER NAME 502 | PASSWORD 503 | PERMISSION 504 |
|---|---|---|---|
| user0001 | ABC | 11111 | content 0001<br>content 0002<br>content 0003<br>service 0001<br>service 0002 |
| user0002 | DEF | 22222 | content 0003<br>service 0001<br>service 0002 |
| user0003 | GHI | 33333 | content 0002<br>service 0001<br>service 0003 |
| ... | ... | ... | ... |

| USER ID 601 | AUTHENTICATION INFORMATION 602 | EXPIRATION PERIOD 603 | TOKEN ID 604 |
|---|---|---|---|

FIG. 6

AUTHENTIC SERVER, USER TERMINAL, CONTENT SERVER, CONTROL METHOD FOR THESE, AND COMPUTER PROGRAM

CROSS REFERENCE TO RELATED APPLICATIONS

This application is a National Stage of International Application No. PCT/JP2015/068651, filed Jun. 29, 2015, the contents of which are incorporated herein by reference in its entirety.

TECHNICAL FIELD

The present invention relates to an authentication server, a user terminal, a content server, control methods therefor, and computer programs.

BACKGROUND ART

In recent years, it has become commonplace for a user to acquire content such as videos, sound and the like from a content server via the Internet and to consume the content at a user terminal. Methods for acquiring content include playback systems, in which the whole of content is downloaded from a server and the content is played after the download has completed, and streaming systems, in which content is played while being downloaded from a server. As a result of communication speeds drastically improving and online storage services such as cloud services being provided, consumption of streaming systems has become predominant recently.

When a user is trying to stream content, the user is authenticated beforehand, a token is issued in accordance with an authentication result, and the user may use the token to access the content server (see Patent Document 1).

Patent Document 1: Japanese Unexamined Patent Application, Publication No. 2013-229644

DISCLOSURE OF THE INVENTION

Problems to be Solved by the Invention

However, after the start of streaming using a token, if communications are disconnected due to circumstances such as a deterioration in communication conditions or the like and the streaming is interrupted, a restart is necessary. If the token previously being used cannot be used again, the user must go through reauthentication and acquire a new token. The duration of an interruption of streaming caused by this reauthentication procedure is long. Thus, convenience for the user is poor.

Accordingly, in order to solve the problem described above, the present invention provides a technology for streaming using a token that, when streaming is to be restarted after an interruption, omits reauthentication by a user and enables a prompt restart.

Means for Solving the Problems

In order to solve the problem described above, an authentication server according to one aspect of the invention authenticates a user of a user terminal that executes streaming of content provided by a content server, the authentication server authenticating the user for the streaming, and the authentication server including:

storage means that stores registration information of a plurality of users;

authentication means that, when the authentication means receives an authentication request for streaming of content designated by a first user among the plurality of users from a user terminal that the first user is using, compares information included in the authentication request with the registration information and authenticates the first user;

generation means that, if the authentication succeeds, generates a first token indicating that the first user is an authenticated user; and communications means that transmits the generated first token to the user terminal, wherein, when the communications means receives an issue request for a second token relating to the same content as the designated content from the user terminal, the communications means transmits an enquiry to the content server as to whether the user terminal is continuing to stream the designated content, if the communications means receives a response from the content server that the user terminal is continuing to stream the designated content, the generation means generates a second token, and the communications means transmits the second token to the user terminal.

In order to solve the problem described above, a user terminal according to another aspect of the invention executes streaming of content provided from a content server, the user terminal including communications means and output means, the communications means:

transmitting to an authentication server an authentication request by the user terminal to stream content designated by a user of the user terminal from among content that can be provided by the content server;

receiving a first token from the authentication server, the first token being issued in response to the authentication request and permitting the user terminal to stream the designated content;

transmitting a streaming start request of the designated content to the content server, the streaming start request including the first token; and receiving the designated content, the designated content being transmitted by the content server in response to the streaming start request, and the output means outputting the designated content received from the content server, wherein, when a predetermined duration has passed from reception of the designated content, the communications means transmits an issue request for a second token to the authentication server and receives the second token that is issued, the second token permitting the user terminal to stream the same content as the designated content, and when streaming is to be restarted after communications with the content server are disconnected and the streaming of the designated content is interrupted, the communications means transmits a streaming restart request of the designated content to the content server, the streaming restart request including the second token.

In order to solve the problem described above, a content server according to still another aspect of the invention provides content to a user terminal, the user terminal being used by a user authenticated by an authentication server and executing streaming of the content, the content server including:
  a content database that stores data of a plurality of units of content; and
  communications means, the communications means:
  receiving a streaming start request from the user terminal for content designated by the user from among the plurality of units of content, the streaming start request including a first token that indicates that the user is authenticated for streaming of the content designated by the user;
  transmitting the first token to the authentication server to request verification of the first token; and
  if the verification of the first token by the authentication server succeeds, transmitting data of the designated content to the user terminal,
  wherein,
  if communications with the user terminal are disconnected after the communications means starts transmitting the data of the designated content to the user terminal, then when the communications means receives a streaming restart request for the same content as the designated content from the user terminal, the streaming start request including a second token that indicates that the user is authenticated for streaming of the content designated by the user, the communications means transmits the second token to the authentication server to request verification of the second token and transmits data of the same content as the designated content to the user terminal without waiting to receive a verification result of the second token from the authentication server.

Effects of the Invention

According to the present invention, in streaming using a token, when streaming is to be restarted after an interruption, re-authentication by a user is omitted and a prompt restart is enabled.

BRIEF DESCRIPTION OF THE DRAWINGS

FIG. 5 is a diagram depicting an example of a data structure of information registered in a user information database 105 according to the embodiment of the invention.

FIG. 6 is a diagram depicting an example of a data structure of a token generated by the authentication server 103 according to the embodiment of the invention.

PREFERRED MODE FOR CARRYING OUT THE INVENTION

Below, an embodiment relating to the present invention is described using the drawings. The embodiment illustrated below is an example and is not limiting. Accordingly, alternative structures are possible as long as the characteristic structures of the present invention may be applied.

Herebelow, one embodiment of the present invention is described with reference to the attached drawings. Note that the structural elements recited in this embodiment are merely examples; there is no intent to limit the scope of the present invention to these structural elements.

System Configuration

Figure 1:
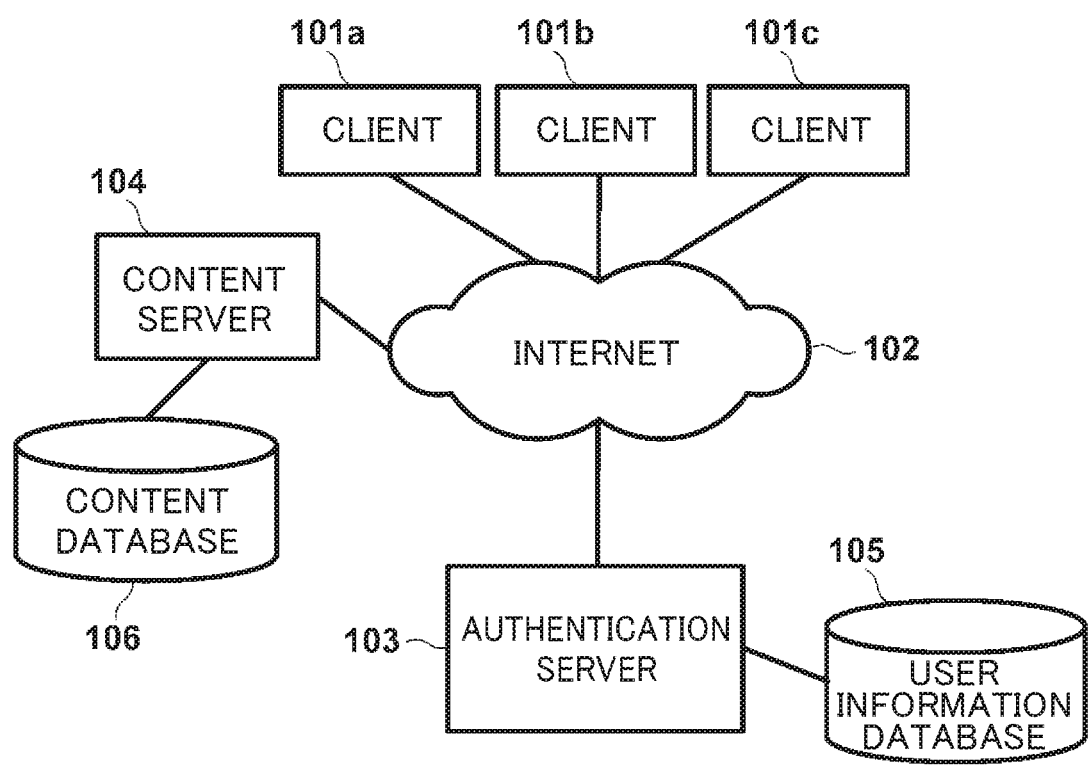
FIG. 1 is a diagram depicting a structural example of the whole of a streaming system according to an embodiment of the invention.

FIG. 1 is a block diagram depicting overall structure of a streaming system according to the present embodiment. In this streaming system, a user terminal, an authentication server and a content server are connected to the Internet. User information is not retained at the content server side; user authentication is conducted between the user terminal and the authentication server. The authentication server may provide a portal site and users may be registered users of the portal site. Clients 101a, 101b and 101c (referred to in general below as "the client 101") are user terminals that are operated by users, are subject to user authentication by the authentication server, and then execute streaming to download content from the content server while playing the content in parallel. The authentication server is a server that authenticates a user of the client 101. The content server 104 is a server that provides content to the client 101 that the user who has been authenticated by the content server 104 is using. The client 101, the authentication server 103 and the content server 104 are each connected to an Internet 102, and are capable of communicating with one another. The user information database 105 is connected to the authentication server 103. A content database 106 is connected to the content server 104.

The client 101 is a user terminal or information processing device that a user operates and that enables listening to/watching of content by executing streaming to download content provided by the content server while concurrently playing the content. The client 101 may be, for example, a laptop computer, a desktop computer, a personal digital assistant, a portable telephone, a smartphone, a tablet terminal or the like. Software such as an "Internet browser" (that is enabled to play streaming content with a plug-in) or a playback application for playing streaming content is installed on the client 101.

The client 101 is connected to the Internet 102 by a wireless data communications system such as a wireless LAN, LTE or the like. A configuration may be formed in which access to the network 102 is enabled by a LAN featuring network cables such as Ethernet (registered trademark) or the like. The Internet 102 is a network in which networks around the world are connected to one another. The Internet 102 may also be, for example, a network that can only be connected to within a particular organization, such as an intranet.

The authentication server 103 retains registration information of respective users of the client 101. The authentication server 103 is an information processing device that, when a user attempts to receive a content streaming service from the content server 104, makes a determination as to whether that user has the right to receive the streaming service. In the present embodiment, this processing to determine whether or not the user has the right is referred to as "authentication", "user authentication" or "authentication processing". Depending on the result of the determination as to whether or not the user has this right, the authentication server 103 issues a token indicating that the user has the right to receive the streaming service, and transmits the token to the client 101. The authentication server 103 also manages the user information database 105. For example, the authentication server 103 is connected to the user information database 105 by a LAN.

The content server 104 provides (transmits) content designated in accordance with a streaming request from the client 101 to the client. The content server 104 according to the present embodiment does not necessarily include an authentication function and is not neccesarily required to manage information for authenticating users. However, the content server 104 does manage content provision conditions that determine what content is to be provided to which users. The content server 104 manages content data stored in the content database 106. The content server 104 is, for example, connected to the content database 106 by a LAN. The user information database 105 and content database 106 are information processing devices in each of which database software is installed. The user information database 105 and content database 106 manage various kinds of data.

The user information database 105 manages registration information for each user. To be specific, the user information database 105 associates and stores a user identifier for uniquely identifying a user (a user ID), user registration information for determinations as to whether a user is the registered user (for example, an associated user name and password or the like), service identification information that identifies which services the user has the right to receive (a service ID), and content identification information that identifies which content the user has the right to receive (a content ID). An example of information registered in the user information database 105 is described below with reference to FIG. 5. In accordance with user registration information that is included in a content acquisition request received from the client 101 (a user name and password), the authentication server 103 searches the user information database 105 and makes a determination as to whether the user has the right to provision of the desired content/service.

The content database 106 stores and manages content data to be provided from the content server 104 to the client 101. This content data includes data of images, videos, sound and so forth. The content data is assigned content IDs for uniquely identifying the content data and service IDs for uniquely identifying services that provide content data.

For convenience, in the present Specification the authentication server 103, the content server 104, the user information database 105 and the content database 106 are described as being realized by physically respectively separate information processing devices. However, embodiments of the present invention are not limited thus. For example, these elements may be realized by a single information processing device. Alternatively, each device such as the authentication server 103 or the like may be formed in a redundant configuration or a distributed configuration of plural information processing devices. Moreover, although the user information database 105 is described as being connected to the authentication server 103 by a LAN or the like, a mode may be adopted in which, for example, the user information database 105 is capable of communicating with the authentication server 103 via the Internet 102, an intranet that is not depicted in the drawings or the like. The same applies to the connection between the content server 104 and the content database 106.

In the present embodiment, in order to simplify descriptions, a case in which authentication service provision and content streaming service provision are performed separately by the authentication server 103 and the content server 104 is recited. However, system configurations are not limited thus. That is, a server for providing authentication services and a server for providing streaming services may be provided as the same server.

Configurations of Information Processing Devices

Figure 2:
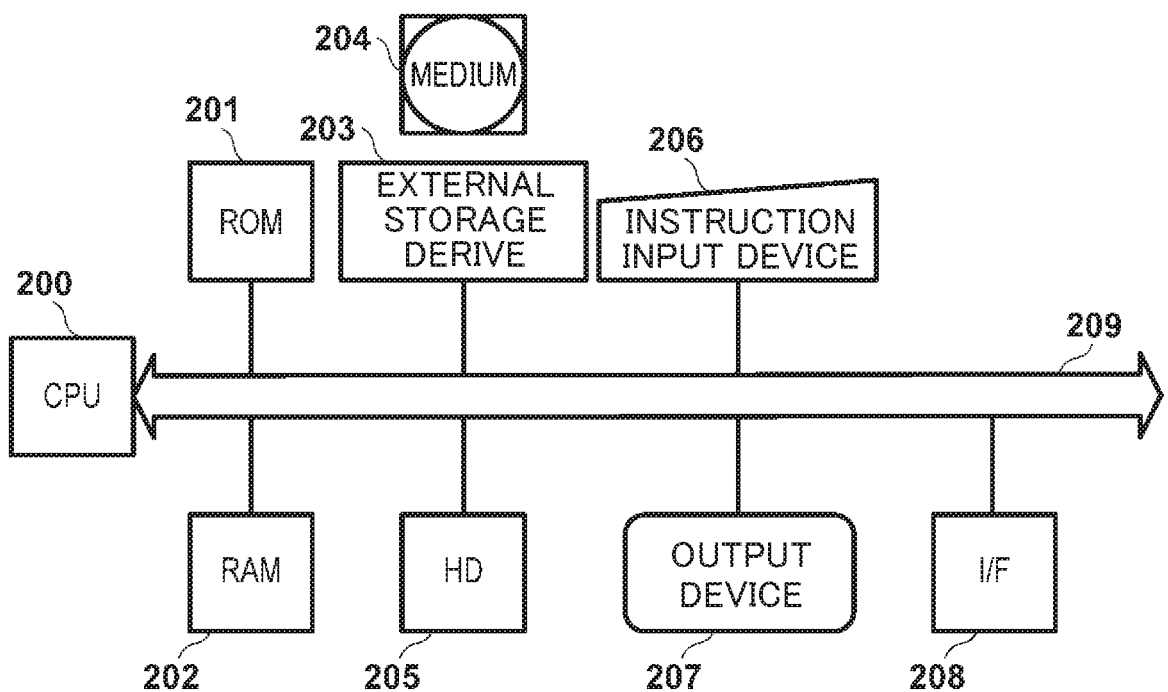
FIG. 2 is a block diagram depicting an example of a hardware configuration of a client 101 according to the embodiment of the invention.

Now, information processing devices that structure the streaming system corresponding to the present embodiment are schematically described. FIG. 2 is a block diagram depicting an example of a hardware configuration of the client 101. The user information database 105 and content database 106, which are information processing devices as mentioned above, may be structured with similar or identical hardware configurations.

A CPU 200 in FIG. 2 executes application programs, an operating system (OS), control programs and the like that are stored on a hard disc (below referred to as an HD) 205. The CPU 200 controls temporary storage in a RAM 202 of information, files and the like that are required for the execution of the programs. The CPU 200 loads content data that is provided by streaming from the content server 104 and stored in the RAM 202, and converts the data to a format that can be outputted by an output apparatus 207. The CPU 200 also controls transmission and reception of data to and from external equipment via an interface 208, executes analysis and processing of data received from external equipment, and generates data to be transmitted to external equipment (including processing requests and data requests). The processing in FIG. 7 and FIG. 8, which are described below, controls the whole device and is realized by the CPU 200 executing corresponding processing programs.

A ROM 201 stores various kinds of data thereinside, such as a fundamental I/O program, an application program that executes streaming, and so forth. The RAM 202 temporarily stores various kinds of data and functions as a main memory of the CPU 200, a work area and the like. The RAM 202 temporarily stores content data provided by streaming from the content server 104.

An external storage drive 203 is an external storage drive for implementing access to recording media. The external storage drive 203 may load programs and the like stored on a medium (a recording medium) 204 into the present computer system. The medium 204 that is employed may be, for example, a floppy (registered trademark) disc (FD), a CD-ROM, a CD-R, a CD-RW, a PC card, a DVD, a Blu-ray (registered trademark) disc, an IC memory card, an MO disc, a memory stick or the like.

The external storage drive 205 that is employed in the present embodiment is an HD (hard disc) that functions as a large capacity memory. The HD 205 stores application programs, the operating system, control programs, related programs and so forth. A non-volatile storage device such as a Flash (registered trademark) memory or the like may be employed instead of the hard disc.

An instruction input apparatus 206 corresponds to a keyboard and pointing device (a mouse or the like), a touch panel, or the like. Using the instruction input apparatus 206, a user enters instructions such as commands controlling the device and the like to the client 101. For example, a user may enter an instruction to start streaming, an instruction to request authentication and so forth. The output apparatus 207 outputs corresponding outputs for commands inputted through the instruction input apparatus 206, responses of the client 101 to the commands, and the like. The output apparatus 207 includes a display, a speaker, a headphone terminal and the like. When content provided from the content server 104 is being streamed, the CPU 200 displays images from loaded content data at the display and outputs sounds from the content data through the speaker or the headphone terminal. A system bus 209 handles flows of data within the information processing device.

The interface (below referred to as the I/F) 208 plays the role of intermediating exchanges of data with external equipment. To be specific, the interface 208 may include a wireless communications module. This module may include widely known circuit structures, including an antenna system, an RF transceiver, one or more amplifiers, a tuner, one or more oscillators, a digital signal processor, a codec chipset, a subscriber identification module card, a memory and so forth. A wired communications module for connections by wire may also be included. The wired communications module is capable of communications with other devices via one or more external ports. Furthermore, various software components for processing data may be included. The external ports link with other devices directly via Ethernet, USB, IEEE1394 or the like, or indirectly via a network. A configuration is possible in which the hardware equipment described above is replaced with software that realizes similar functions.

When a program corresponding to the execution of processing according to the present embodiment is to be activated, the program may be loaded into the RAM 202 from the HD 205, on which the program has been previously installed.

Alternatively, a program according to the present embodiment may be stored in advance in the ROM 201, configured to form a portion of a memory map, and executed by the CPU 200 directly. Further, the corresponding program and related data may be loaded into the RAM 202 directly from the medium 204 and executed.

Figure 3:
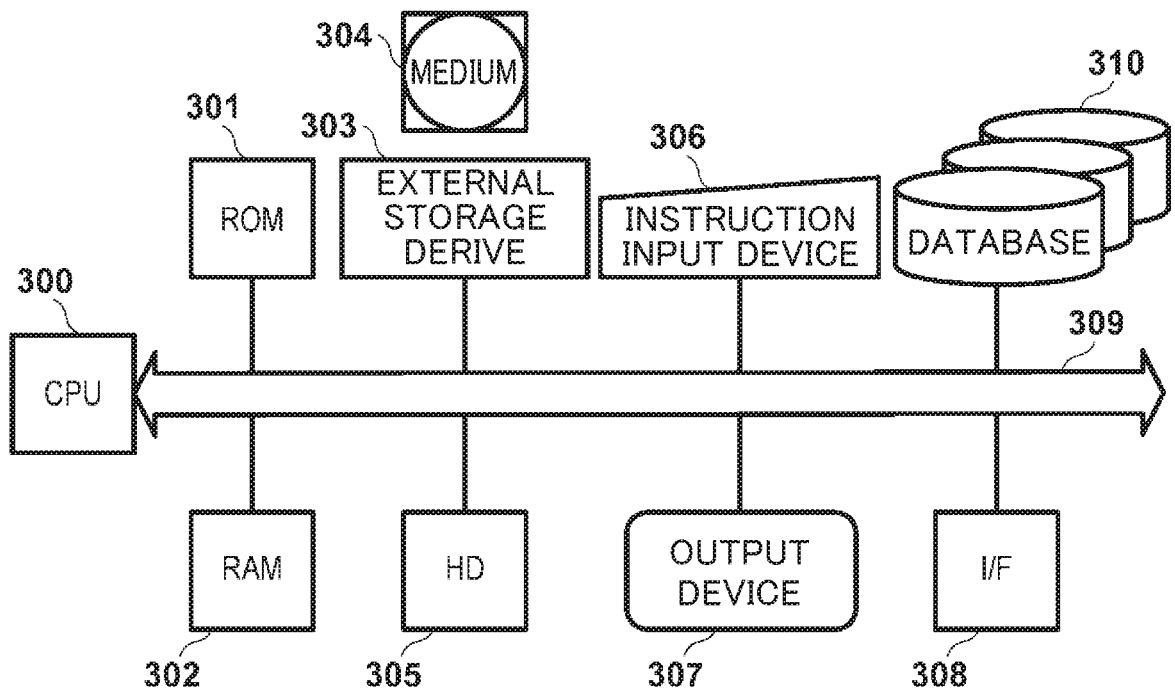
FIG. 3 is a block diagram depicting an equipment configuration of an authentication server 103 and a content server 104 according to the embodiment of the invention.

FIG. 3 is a block diagram depicting an equipment configuration of the authentication server 103 or the content server 104. The functions and purposes of a CPU 300, a ROM 301, a RAM 302, an external storage drive 303, a medium 304, an HD 305, an instruction input apparatus 306, an output apparatus 307, an I/F 308 and a system bus 309, and relationships therebetween, are similar or identical to those described using FIG. 2. FIG. 3 indicates that a database 310 is connected to the system bus 309. This database 310 is a general term for the user information database 105 or content database 106.

User Authentication Processing

Figure 4:
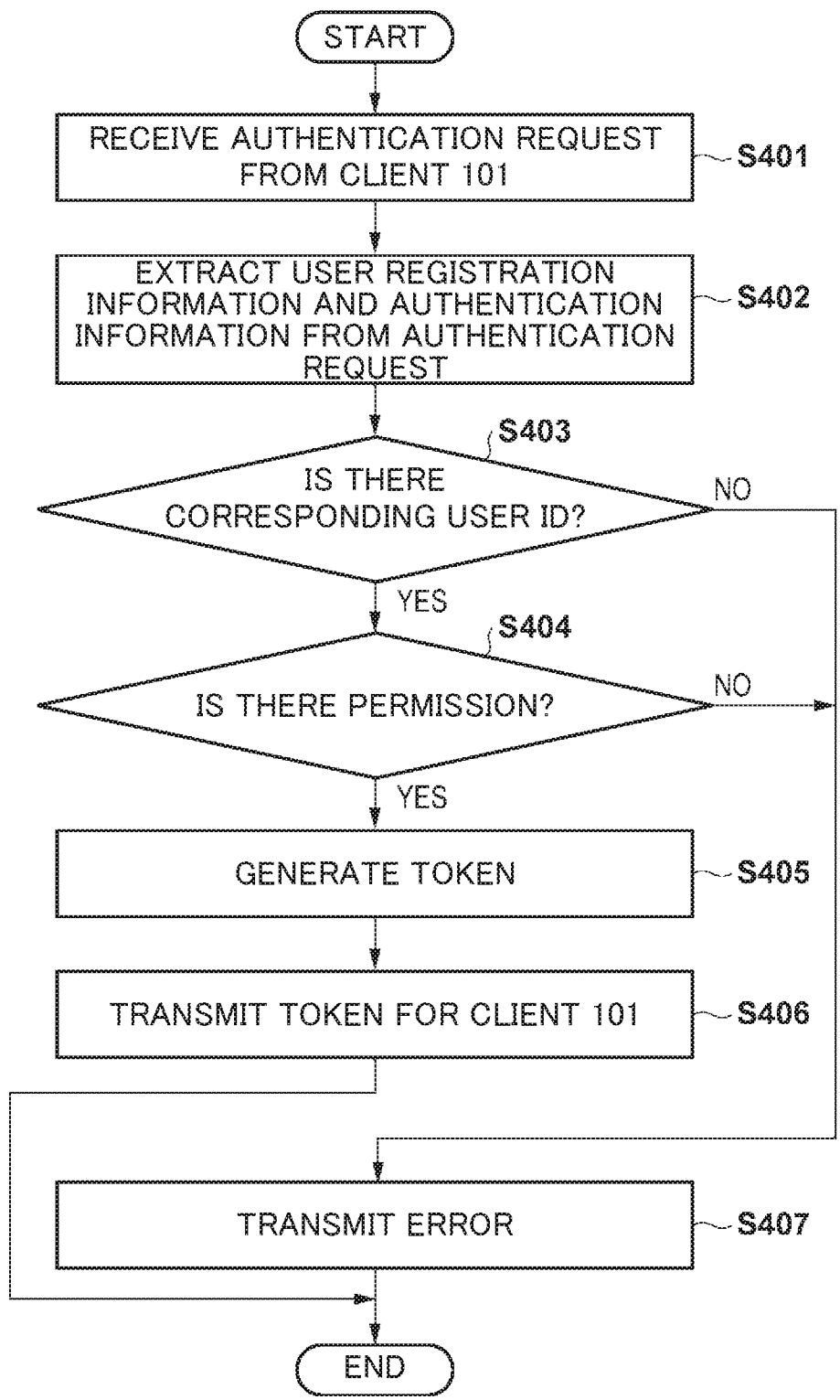
FIG. 4 is a flowchart depicting an example of user authentication processing at the authentication server 103 according to the embodiment of the invention.

Now, user authentication processing according to the embodiment of the invention is described with reference to FIG. 4 to FIG. 6. FIG. 4 is a flowchart depicting an example of user authentication processing at the authentication server 103 according to the embodiment of the invention. The authentication server 103 implements the processing according to FIG. 4 by the CPU 300 executing a processing program retained in the HD 305, the database 310 or the like. FIG. 5 depicts an example of a data structure in the user information database 105. FIG. 6 is a diagram depicting an example of a data structure of a token generated by the authentication server 103.

In step S401 of FIG. 4, the authentication server 103 receives an authentication request from the client 101 via the Internet 102. The authentication request transmitted by the client 101 includes at least user registration information, consisting of a user name and password for identifying the user operating the client 101 and identification information for identifying content and/or a service that the user wishes to acquire from the content server 104. In step S402, the authentication server 103 extracts the user registration information and the identification information from the authentication request.

Then, in step S403, the authentication server 103 makes a determination as to whether the user making the authentication request is registered in the user information database 105. In specific terms, the authentication server 103 makes a determination on the basis of the acquired user registration information as to whether registration information matching that combination of a user name and password is present in the user information database 105 and whether a user ID associated with the registration information can be specified. Now the structure of the user information database 105 in FIG. 5 is described. The user information database 105 includes information such as user IDs 501 for uniquely identifying users, user registration information formed of sets of user names 502 and passwords 503 for determining that users are registered users, and rights 504 assigned to the respective users. User identifiers uniquely assigned to the users are registered as the user IDs 501. User names and passwords, which are arbitrarily specified by users, are registered as the user names 502 and passwords 503 and associated with the user IDs 501. The rights 504 register identification information for identifying the content, services and the like that the users have the rights to receive. In the present embodiment, identification information for uniquely identifying content is referred to as "content IDs", and identification information for uniquely identifying services is referred to as "service IDs". Content IDs are, for example, identification information assigned to units of data such as specific sound data, image data, video data and the like.

In contrast, the concept of a service encompasses the provision of an unspecified number of units of content; for example, in a music distribution service or video distribution service consisting of plural channels, service IDs may be used to identify content provision services channel by channel. More specifically, on an Internet radio site that provides music distribution in 100 channels, if channel units are to be distinguished, separate service IDs may be assigned to the 100 channels. Further, the quality level of content that is provided in a single channel may be divided into levels and a separate service ID may be assigned to a service that provides the content at high quality, to distinguish that service from an ordinary quality service. If programs are compiled hour by hour in a single channel, service IDs may be assigned to identify specific programs broadcast in specific time slots. In the descriptions of the present embodiment, service IDs and content IDs are used in order to simplify the descriptions. However, what is provided to the user is still individual content units. Therefore, service IDs and content IDs may both be referred to without distinction as content IDs in the descriptions of the present embodiment.

Returning to the descriptions of FIG. 4, if a user ID can be specified by the determination of step S403 (YES in step S403), the authentication server 103 proceeds to step S404. If a user ID cannot be specified, the authentication server 103 proceeds to step S407.

In step S404, a determination is made as to whether rights are associated with the user ID specified in step S403. More specifically, a determination is made, on the basis of the registered details in the user information database 105, as to whether identification information matching the identification information extracted in step S402 is associated with the user ID specified in step S403. If the specified user ID and the identification information extracted in step S402 are associated in the user information database 105 (YES in step S404), the authentication server 103 proceeds to step S405. On the other hand, if the identified user ID and the identification information extracted in step S402 are not associated in the user information database 105 (NO in step S404), the authentication server 103 proceeds to step S407. In step S407, an error message is transmitted to the client 101 to report that the authentication of the user failed. When an error message is transmitted, processing to subscribe to the content or service may be executed.

In step S405, a token is generated indicating that the user is an authenticated user (a user with the right to stream the content). In step S406, the generated token is transmitted to the client 101. A data structure example of the token is illustrated in FIG. 6. A token 600 includes at least a user ID 601 that specifies the user to whom the token is issued, identification information 602 for specifying the content and/or service that is permitted to be provided to the user, a validity period 603 of the token 600, and a token ID 604 that uniquely identifies the token 600. Just one or other of a content ID and a service ID may be registered in the identification information, or both may be registered. A structure is also possible that includes IDs of all content and services for which the user has rights. The token ID 604, which may be used during token authentication at the authentication server 103, is information for uniquely identifying the token 600. A different value for the token ID 604 is generated each time a token is issued. The token ID 604 may, for example, be generated using a hash function with information such as the user ID, the content ID, the validity period and the like. The authentication server 103 may retain information on tokens 600 that have been issued for subsequent verification of the tokens.

Figure 7:
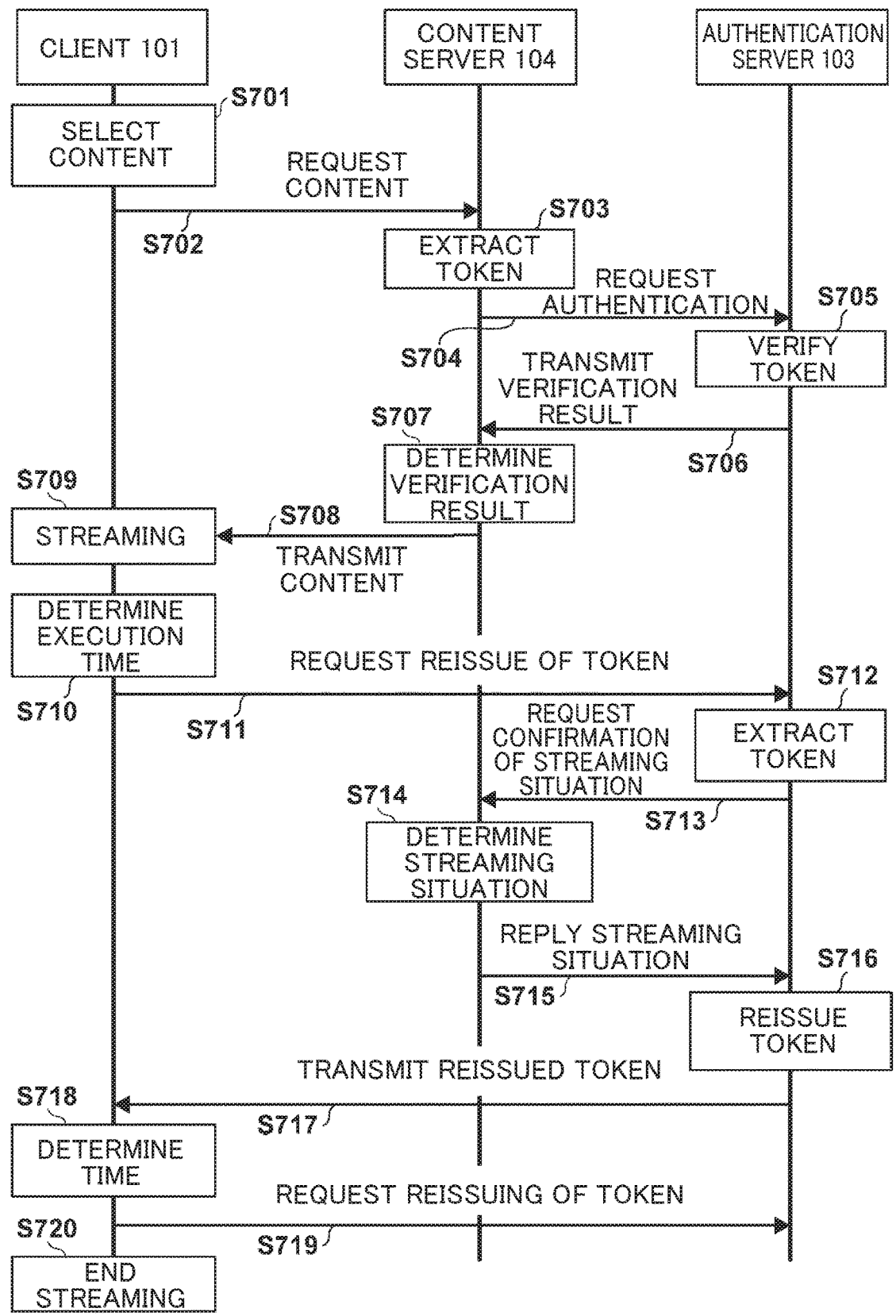
FIG. 7 is a timing chart depicting an example of a flow of processing according to the embodiment of the invention when the client 101 streams content provided from the content server 104.
Figure 8:
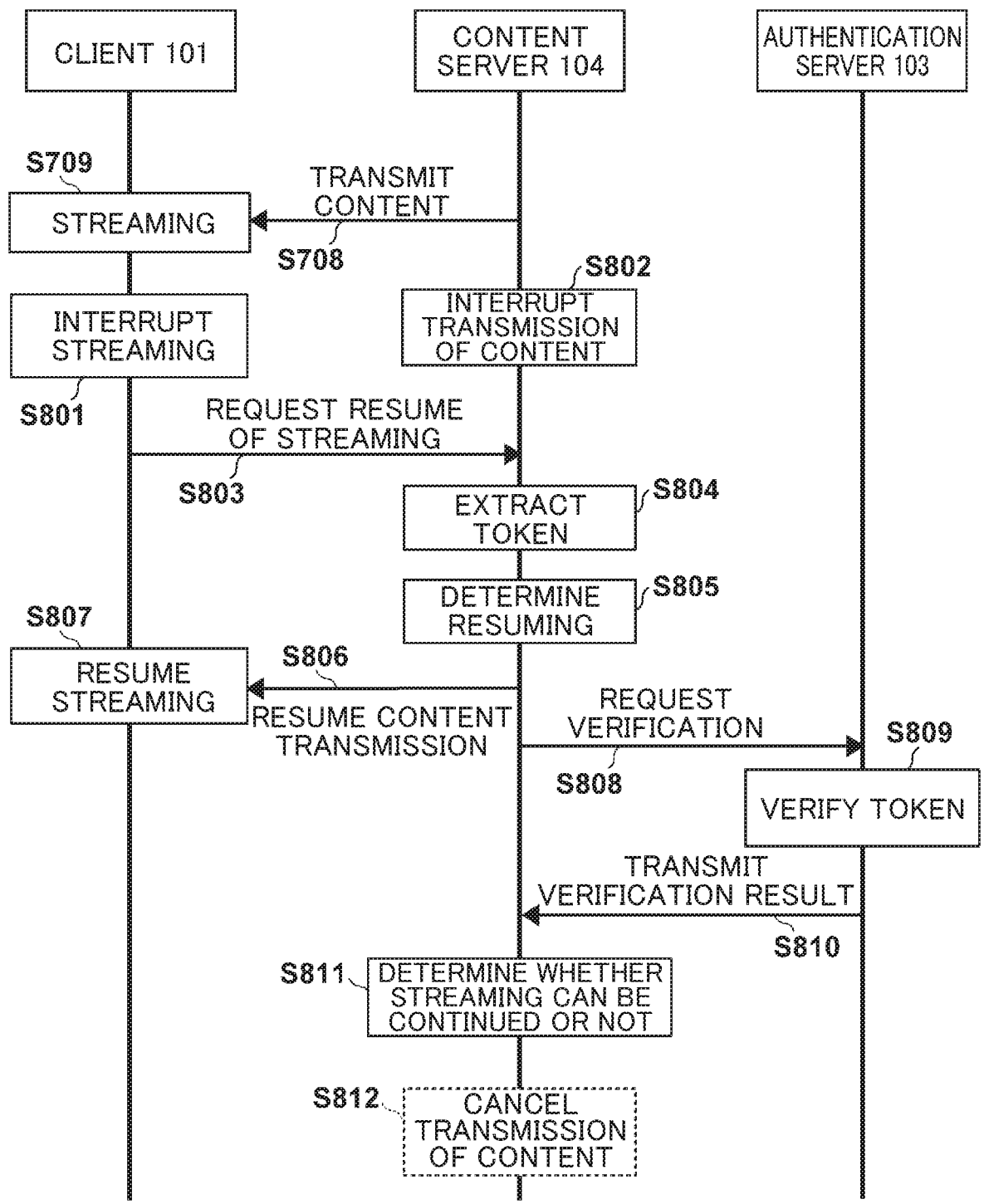
FIG. 8 is a timing chart depicting an example of a flow of processing according to the embodiment of the invention when, in the streaming executed in FIG. 7, the streaming is interrupted by a communications disconnection.

Now, details of streaming processing that is executed by the streaming system of the present invention in accordance with the structures illustrated in FIG. 1 to FIG. 6 are described. FIG. 7 and FIG. 8 are timing charts depicting examples of the streaming processing according to the embodiment of the invention. The processing according to FIG. 7 and FIG. 8 is realized by the client 101, the authentication server 103 and the content server 104 executing respectively retained processing programs. Communications between the client 101, the authentication server 103 and the content server 104 may be realized using communications functions of a web browser that is being executed at the client 101 or communications functions of a web browser plug-in (an extension program). For example, communications may be realized in accordance with the HTTP protocol using JavaScript (registered trademark). Alternatively, Flash or the like may be used; communications may be implemented in accordance with a protocol other than HTTP.

First, a flow of processing when the client 101 is to stream content provided from the content server 104 is described. In step S701, the content or service to be streamed is selected at the client 101. Below, for the sake of simplicity, content and services are referred to in general as content, because whether content is selected or a service is selected, ultimately content is to be provided from the content server 104. The selection of content may be conducted in a content selection screen provided from the content server and displayed at a display of the client 101. The selection of content may be, for example, direct selection of particular content itself. If the content is provided on plural channels, the selection may be made by selecting a channel. Alternatively, a particular service (for example, a service that provides music or video at high quality) may be selected.

At this time, the content and services displayed to be selectable in a content selection screen may be limited to content and services for which rights have been confirmed in a token acquired by the client 101 through the authentication processing described with FIG. 4, and content and services for which no token is required. The authentication processing described in FIG. 4 may be implemented at the time of content selection in step S701.

In step S702, a content request for requesting the content selected in step S701 is transmitted from the client 101 to the content server 104. This content request includes the token 600 that has been acquired by the authentication processing of FIG. 4, including the identification information 602 corresponding to the selected content.

When the content server 104 receives the content request from the client 101, in step S703, the content server 104 extracts the token 600 from the received content request. Then, in step S704, the content server 104 sends a verification request to the authentication server 103 for the token 600 provided from the client 101. This token verification is performed to confirm that the received token 600 is a token that was legitimately issued to the user of the client 101 and has not been altered or falsified. When the authentication server 103 receives the verification request from the content server 104, the authentication server 103 executes token verification processing in step S705. The authentication server 103 extracts the token 600 from the received verification request and executes verification processing. The authentication server 103 may have previously associated and retained the user ID and token ID included in each token 600 that is issued. Then, when a verification request is received, the authentication server 103 may carry out verification processing by making a determination as to whether or not the combination of user ID and token ID included in the token 600 received from the content server 104 matches previously retained details. If the token ID is generated by a hash function, the authentication server 103 may execute the verification processing by applying the hash function to the information included in the received token 600 and making a determination as to whether the obtained value is the same as the token ID of the retained token.

The authentication server transmits a verification result for the token 600 to the content server 104 in step S706. When the content server 104 receives the verification result from the authentication server 103, in step S707, the content server 104 analyzes the verification result. If the token 600 has been successfully validated as being valid, then in step S708 the content server 104 starts transmitting the content for streaming at the client 101. In step S709, the client 101 plays the received streaming content. The transmission of streaming content in step S708 and the playback of the streaming content in step S709 are ended if the user of the client 101 gives an instruction to stop watching/listening to the played content, or if the connection between the content server 104 and the client 101 is disconnected due to some other circumstances (a disconnection of communications or the like).

When the client 101 has started the playback of the streaming content, the client 101 measures the playback duration and, in step S710, makes determinations as to whether a predetermined duration has passed from the start of playback. If the predetermined duration has passed, in step S711, the client 101 requests a reissue of the token 600 from the authentication server. The predetermined duration may be an arbitrary duration that is at least zero seconds. That is, the client 101 may transmit a token reissue request immediately after starting playback, or may transmit the token reissue request after some time. The token reissue request may include the token 600 that was attached when the content was requested in step S701. Even if the token 600 itself is not included, the user ID 601 and the identification information 602 are sufficient to enable specification of the reissue request. If the previous token 600 is included in the token reissue request, in step S712, the authentication server 103 extracts the token 600 included in the token reissue request. If the token 600 is not included in the reissue request, the authentication server 103 extracts information corresponding to the user ID 601 and the identification information 602.

In step S713, in accordance with the user ID 601 and the identification information 602 included in the token 600, the authentication server 103 transmits an enquiry as to whether the streaming of the content to the corresponding user is continuing (a streaming status confirmation request) to the content server 104. In step S714, in accordance with the streaming status confirmation request, the content server 104 makes a determination as to whether streaming is being performed for the specified user ID and identification information. In step S715, in accordance with the result of this determination, the content server 104 transmits the streaming status of the user to the authentication server 103. In step S716, if it is determined that the user is continuing the streaming of the content according to the streaming status information received from the content server 104, the authentication server 103 reissues the token 600. Then, in step S717, the authentication server 103 transmits the reissued token 600 to the client 101. The purpose of this confirmation of streaming status at the content server 104 is for use of the token 600 at a time of restarting when the streaming has been interrupted contrary to the intentions of the user. Therefore, a reissue is not necessary if playback is not continuing.

When the token 600 is reissued in step S716, the authentication server 103 may specify the token 600 with a shorter validity period than when the token 600 was issued before the content request (generated in step S405 in FIG. 4). The reissued token 600 is issued so that an authentication procedure at a restart when streaming has been interrupted can be omitted. It is sufficient if the token 600 is valid within the scope of this objective. The token generated in step S405 is referred to as a "first token" and the token reissued in step S716 is referred to as a "second token". The first token may be issued with, for example, a validity period in units of hours or days, whereas the the second token may be issued with a validity period shorter than the first token, in units of minutes or hours.

The validity period of the second token may be a validity period that corresponds to a remaining playback duration of the streaming content that is currently continuing. For example, if a 100-minute movie is being consumed by streaming, when playback is starting, the second token 600 may be issued with a validity period of 100 minutes. Thereafter, if communications between the client 101 and the content server 104 are disconnected 50 minutes after the start of playback, an interruption of streaming occurs and the second token 600 is used, the validity period of the second token 600 that is reissued thereafter may be set to 50 minutes. Further, if the token 600 is issued for a program that is broadcast in a specific time slot on a channel, similarly, the second token 600 may be issued with a validity period corresponding to the remaining duration of the program.

Accordingly, the token reissue request sent by the client 101 in step S711 may include information on the remaining duration of the content at the time the request is sent. If information on the remaining duration is not included in the token reissue request, then, for example, the authentication server 103 may make an additional enquiry about the remaining playback duration to the content server 104 when requesting the streaming status confirmation in step S713. Then, in step S715, information on the remaining playback duration may be included in the streaming status that is returned by the content server 104. The authentication server 103 may set the validity period in accordance with the remaining playback duration that is acquired in this manner.

When the client 101 receives the reissued second token 600, in step S718 the client 101 makes determinations as to whether a duration according to the validity period of the second token 600 has passed. At a timing at which the validity period expires, or a predetermined duration before that timing, the client 101 transmits a reissue request for the second token 600 to the authentication server 103. The second token 600 that was transmitted in step S717 may be included in this request. The client 101 makes a determination as to whether the streaming of the corresponding content is being performed. The client 101 transmits the reissue request only if the streaming is being performed. If the validity period is specified on the basis of the remaining playback duration of the content, it may seem that there is no point in determining whether the validity period has expired. However, if the user pauses the streaming or communication speeds are slow during the streaming, playback may not be conducted continuously. Therefore, with regard to such situations, even when the validity period is specified on the basis of the remaining playback duration, there is significance in determining the timing at which the validity period expires.

Subsequent processing is similar to steps S712 to S717. Second tokens are reissued while streaming continues until the streaming of the content is complete according to the validity period of the reissued token 600. When the streaming is complete, in step S720, the client 101 carries out termination processing and destroys the reissued second token 600 that is currently retained.

Now, a flow of processing when streaming is interrupted by a communications disconnection during streaming that is being conducted according to FIG. 7 is described with reference to FIG. 8. First, in step S708 and step S709 according to the procedure depicted in FIG. 7, streaming of the content is performed between the client 101 and the content server 104. In this state, in step S801, the client 101 cannot receive the content from the content server 104 for a reason such as a disconnection of communications between the client 101 and the content server 104 or the like. As a result, playback is interrupted. In step S802, the content server 104 stops transmission of the content.

At this time, a content request including the token 600 must again be transmitted in order to restart the stream. In the present embodiment, the client 101 includes the second token 600 reissued by the processing of step S711 to step S717 of FIG. 7 in the content request. Accordingly, in step S803, the client 101 transmits a streaming restart request including the second token 600 to the content server 104. The content server 104 extracts the token 600 from the streaming restart request received from the client 101 in step S804, and makes a restart determination in step S805.

When the authentication server 103 receives the second token 600, the authentication server 103 must carry out a procedure to confirm whether the token is valid. At this time, because the user of the client 101 cannot restart watching/listening to the content until this procedure is complete, there is a high likelihood of the user feeling stress. Accordingly, in the present embodiment, restart determination processing is carried out in step S805; a determination is made from the user ID and content ID included in the streaming restart request as to whether the user was performing streaming just prior to sending the streaming restart request. If it is determined that the user was performing streaming just prior, the streaming is restarted in step S806 without waiting for a token confirmation result from the authentication server 103. On the other hand, if the user was not performing streaming just prior, the authentication server 103 waits for a confirmation result from the authentication server 103 and then makes a determination as to whether to restart streaming. FIG. 8 depicts a situation in which the user was performing streaming just prior.

In step S808, the content server 104 transmits a verification request for the second token 600 to the authentication server 103. In step S809, the authentication server 103 verifies the second token 600, and in step S810, the authentication server 103 returns the verification result to the content server 104. The content server 104 inspects the verification result received from the authentication server 103. In step S811, the content server 104 makes a determination as to whether to continue the streaming on the basis of whether or not the token 600 is valid. If the token is valid, the content server 104 continues the restarted streaming. On the other hand, if there is no valid token, the content server 104 stops the restarted streaming in step S812.

In the embodiment described above, a case is described in which tokens can only be used one time. However, configurations in which tokens can only be used one time and configurations in which tokens can be used multiple times until only one use remains are both encompassed by the invention. The embodiment of the invention described above may be employed even if tokens can be used multiple times. That is, if a token can be used multiple times, the token cannot be used beyond a limit on the number of times of use. If communications are disconnected and streaming is interrupted after this limit is reached, a procedure to acquire the token again is necessary. In this case, if the present embodiment described above is employed, the streaming continues when the remaining number of uses reaches one, and a reissue of the token is executed in the background. Hence, if the remaining one use is used and streaming is conducted, even if there is then a disconnection of communications, the reissued token may be used and streaming may be restarted immediately.

According to the above description, in a content streaming service using a token that can only be used the remaining one time, if the streaming is interrupted by circumstances such as a disconnection of communications or the like, the already acquired token may be used and streaming may be smoothly restarted. Therefore, there is no need to perform verification processing each time the user interrupts the stream, and the user may conduct streaming without stress.

Alternative Embodiments

The present invention is not limited to the embodiment described above; numerous modifications and improvements are possible without departing from the spirit and scope of the present invention. Accordingly, the claims below are attached in order to publicize the technical scope of the present invention. The information processing devices according to the present invention may be realized by programs that cause one or more computers to function as the information processing devices. These programs may be supplied/distributed by being recorded on computer-readable recording media or supplied/distributed through electronic communications circuits.

The invention claimed is:

1. An authentication server that authenticates a user of a user terminal that plays a content stream provided by a content server, the authentication server comprising:
   at least one processor; and
   at least one memory that stores registration information of a plurality of users and computer program code, which when executed by the at least one processor, causes the at least one processor to:
      receive an authentication request for content designated by a first user among the plurality of users from a user terminal that the first user is using;
      compare information included in the authentication request with the registration information and authenticate the first user;
      if the authentication succeeds, generate a first token indicating that the first user is an authenticated user for the content designated by the first user;
      transmit the first token to the user terminal that the first user is using;
      based on receiving a token reissue request by the first user for reissuing the first token prior to expiration of the first token, transmit a streaming status confirmation enquiry to the content server, the streaming status confirmation enquiry asking whether the user terminal that the first user is using is continuing to stream the content designated by the first user;
      based on receiving, from the content server, a response to the transmitted streaming status confirmation enquiry that indicates that the user terminal that the first user is using is continuing to stream the content designated by the first user, generate a second token that is for resuming the same content as the content authenticated by the first token; and
   transmit the second token to the user terminal that the first user is using, wherein
      after streaming of the designated content authenticated by the first token is interrupted because communication between the first user terminal and the content server are disconnected or deteriorated, the first terminal transmits, to the content server, a streaming restart request for resuming play of the designated content authenticated by the first token, the streaming restart request including the second token,
      the content server transmits, to the authentication server, the second token to request verification of the second token, and resumes streaming of the same content authenticated by the first token to the first user terminal without waiting to receive a verification result of the second token from the authentication server,
      the authentication server verifies the second token, and the content server stops the content streaming having been resumed, if the verification of the second token by the authentication server fails.

2. The authentication server according to claim 1, wherein said computer program code further causes the at least one processor to:
   specify a validity period of the first token; and specify a validity period of the second token to be shorter than the validity period of the first token.

3. The authentication server according to claim 2, wherein said computer program code further causes the at least one processor to:
specify the validity period of the second token to correspond to a remaining playback duration of the streaming content that is currently continuing.

4. A user terminal that plays a content stream provided from a content server, the user terminal comprising:
at least one processor; and
at least one memory that stores computer program code that, when executed by the at least one processor, causes the at least one processor to:
transmit, to an authentication server, an authentication request by the user terminal to play content designated by a first user of the user terminal from among content that can be streamed from the content server;
receive a first token from the authentication server, the first token being issued in response to the authentication request being received and permitting the user terminal to play the designated content;
transmit a streaming start request of the designated content to the content server, the streaming start request including the first token;
receive the designated content, the designated content being transmitted by the content server to the user terminal in response to the content server receiving the streaming start request;
play the designated content received from the content server;
when a predetermined duration has passed from reception of the content designated by the first user, which is prior to expiration of the first token, transmit, to the authentication server, a token reissue request that requests reissue of the first token;
receive a second token that is issued by the authentication server, the second token permitting the user terminal to resume playing the same content as the designated content authenticated by the first token; and
after streaming of the designated content authenticated the first token is interrupted because communications between the user terminal and the content server are disconnected or deteriorated, transmit, to the content server, a streaming restart request for resuming play of the designated content authenticated by the first token, the streaming restart request including the second token, wherein
based on receiving a token reissue request by the first user for reissuing the first token prior to expiration of the first token, the authentication server transmits a streaming status confirmation enquiry to the content server, the streaming status confirmation enquiry asking whether the user terminal that the first user is using is continuing to stream the content designated by the first user,
based on receiving, from the content server, a response to the transmitted streaming status confirmation enquiry that indicates that the user terminal that the first user is using is continuing to stream the content designated by the first user, the content server generates a second token that is for resuming the same content as the content authenticated by the first token,
the content server transmits, to the authentication server, the second token to request verification of the second token, and resumes streaming of the same content authenticated by the first token to the first user terminal without waiting to receive a verification result of the second token from the authentication server,
the authentication server verifies the second token, and
the content server stops the content streaming having been resumed, if the verification of the second token by the authentication server fails.

5. The user terminal according to claim 4, wherein said computer program code further causes the at least one processor to:
at a timing at which a validity period of the second token expires or a predetermined period before the timing, transmit a token reissue request that requests reissue of the second token to the authentication server.

6. The user terminal according to claim 4, wherein said computer program code further causes the at least one processor to:
discard the second token when the streaming of the designated content ends.

7. The user terminal according to claim 4, wherein said computer program code further causes the at least one processor to: after the predetermined duration has passed from reception of the designated content, transmit request for the second token to the authentication server.

8. A content server that provides content to a user terminal, the user terminal playing a stream of the content, and the content server comprising:
at least one processor; and
at least one memory that stores computer program code that, when executed by the at least one processor, causes the at least one processor to:
store data of a plurality of pieces of content;
receive, from a first user terminal that a first user is using, a streaming start request for streaming content designated by the first user from among the plurality of pieces of content, the streaming start request including a first token that indicates that the first user is authenticated for streaming of the content designated by the first user;
transmit the first token to an authentication server to request verification of the first token;
if the verification of the first token by the authentication server succeeds, stream data of the designated content to the first user terminal; and
after streaming of the designated content authenticated by the first token by the first user terminal is interrupted because communication between the first user terminal and the content server are disconnected or deteriorated, and a streaming restart request for resuming play of the same content as the designated content authenticated by the first token is received from the first user terminal, transmit the second token to the authentication server to request verification of the second token and resume streaming of the same content authenticated by the first token to the first user terminal without waiting to receive a verification result of a second token from the authentication server, the second token being included in the streaming restart request, and the second token indicating that the first user is authenticated for streaming of the designated content authenticated by the first token; and stop the content streaming having been resumed, if the verification of the second token by the authentication server fails, wherein based on a token reissue request by the first user for reissuing the first token prior to expiration of the first token, the authentication server transmits a streaming status confirmation enquiry to the content server, the streaming status confirmation enquiry asking whether the user terminal that the first user is using is continuing to stream the content designated by the first user, and based on receiving, from the content server, a response to the transmitted streaming status confirmation enquiry that indicates that the user terminal that the first user is using is continuing to stream the content designated by the first user, the content server generated a second token that is for resuming the same content as the content authenticated by the first token.

9. A content streaming method comprising:

transmitting, by a first user terminal to an authentication server, an authentication request for streaming of content designated by a first user;

authenticating, by the authentication server, the first user, including comparing information included in the authentication request with registration information of the first user in registration information of a plurality of users;

if the authentication succeeds, generating, by the authentication server, a first token indicating that the first user is an authenticated user for the content designated by the first user, and transmitting, by the authentication server, to the first user terminal, the first token;

transmitting, by the first user terminal to a content server, a streaming start request for streaming the content designated by the first user, the streaming start request including the first token;

transmitting, by the content server to the authentication server, the first token included in the streaming start request to request verification of the first token;

verifying, by the authentication server, the first token;

if the verification of the first token by the authentication server succeeds, causing, by the content server, the content designated by the first user to be streamed to the first user terminal;

when a predetermined duration has passed from reception of the content designated by the first user, transmitting, by the first user terminal to the authentication server, prior to expiration of the first token, a token reissue request for reissuing the first token;

based on receiving the token reissue request for reissuing the first token prior to expiration of the first token, transmitting, by the authentication server to the content server, a streaming status confirmation enquiry to the content server, the streaming status confirmation enquiry asking whether the first user terminal that the first user is using is continuing to stream the content designated by the first user;

based on receiving, from the content server, a response to the transmitted streaming status confirmation enquiry that indicates that the first user terminal is continuing to stream the content designated by the first user, generating, by the authentication server, a second token and transmitting the second token to the first user terminal, the second token permitting the first user terminal to resume playing the same content as the content authenticated by the first token;

receiving, by the first user terminal, the generated second token;

after streaming of the designated content authenticated by the first token is interrupted because communication between the first user terminal and the content server are disconnected or deteriorated, transmitting, by the first user terminal to the content server, a streaming restart request for resuming play of the designated content authenticated by the first token, the streaming restart request including the second token;

resuming, by the content server, streaming of the same content authenticated by the first token to the first user terminal without waiting to receive a verification result of the second token from the authentication server; and stopping, by the content server, the content streaming having been resumed, if the verification of the second token by the authentication server fails, wherein the content streaming method further comprises transmitting, by the content server to the authentication server, the second token to request verification of the second token and verifying, by the authentication server, the second token.

10. A non-transitory computer readable tangible information storage medium having stored therein the computer program code recited in claim 1.

11. A non-transitory computer readable tangible information storage medium having stored therein the computer program code recited in claim 4.

12. A non-transitory computer readable tangible information storage medium having stored therein the computer program code recited in claim 8.

* * * * *